（12) United States Patent
Yamazaki et al.

(10) Patent No.: US 10,251,156 B2
(45) Date of Patent: Apr. 2, 2019

(54) BASE STATION AND RADIO TERMINAL

(71) Applicant: KYOCERA CORPORATION, Kyoto (JP)

(72) Inventors: Chiharu Yamazaki, Tokyo (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/849,105

(22) Filed: Dec. 20, 2017

(65) Prior Publication Data

US 2018/0139723 A1 May 17, 2018

Related U.S. Application Data

(63) Continuation of application No. PCT/JP2016/066409, filed on Jun. 2, 2016.

(30) Foreign Application Priority Data

Jun. 26, 2015 (JP) ................................. 2015-128350

(51) Int. Cl.
*H04L 5/00* (2006.01)
*H04W 52/16* (2009.01)
*H04W 72/00* (2009.01)
*H04J 11/00* (2006.01)
*H04W 52/38* (2009.01)
(Continued)

(52) U.S. Cl.
CPC .......... *H04W 72/005* (2013.01); *H04J 11/00* (2013.01); *H04L 5/0007* (2013.01); *H04L 5/0044* (2013.01); *H04L 5/0051* (2013.01); *H04W 52/16* (2013.01); *H04W 52/322* (2013.01); *H04W 52/38* (2013.01); *H04W 4/06* (2013.01)

(58) Field of Classification Search
CPC . H04W 72/005; H04W 52/16; H04W 52/322; H04W 52/38; H04W 4/06; H04L 5/0007; H04L 5/0044; H04L 5/0051; H04J 11/00
See application file for complete search history.

(56) References Cited

U.S. PATENT DOCUMENTS

2013/0195058 A1* 8/2013 Ode .................... H04W 72/048
370/329
2013/0223322 A1* 8/2013 Ode ...................... H04W 16/14
370/312
(Continued)

OTHER PUBLICATIONS

International Search Report issued in PCT/JP2016/066409; dated Jun. 28, 2016.
(Continued)

*Primary Examiner* — Afsar M Qureshi
(74) *Attorney, Agent, or Firm* — Studebaker & Brackett PC

(57) ABSTRACT

A base station according to one embodiment performs superposition transmission that is a scheme for performing MBMS transmission and PDSCH transmission by using the same time-frequency resource. The base station performs the processes of; transmitting PDSCH data to a radio terminal by the PDSCH transmission and transmitting a demodulation reference signal for demodulating the PDSCH data; and transmitting, to the radio terminal, information indicating a ratio or an offset of a transmission power of the demodulation reference signal with respect to a transmission power of the PDSCH data.

10 Claims, 13 Drawing Sheets

(51) Int. Cl.
*H04W 52/32* (2009.01)
*H04W 4/06* (2009.01)

(56) References Cited

U.S. PATENT DOCUMENTS

| | | | | |
|---|---|---|---|---|
| 2014/0198743 | A1* | 7/2014 | Suzuki | H04W 52/146 |
| | | | | 370/329 |
| 2015/0333846 | A1* | 11/2015 | Morita | H04W 16/28 |
| | | | | 455/63.1 |
| 2016/0337018 | A1* | 11/2016 | Hwang | H04L 5/003 |
| 2016/0366691 | A1* | 12/2016 | Kwon | H04L 1/0001 |
| 2017/0288919 | A1* | 10/2017 | Burnet | H04J 11/004 |
| 2018/0069651 | A1* | 3/2018 | Davydov | H04L 5/0001 |

OTHER PUBLICATIONS

3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; 3GPP TS 36.300 V12.5.0; Mar. 2015; pp. 1-251; Release 12; 3GPP Organizational Partners.

* cited by examiner

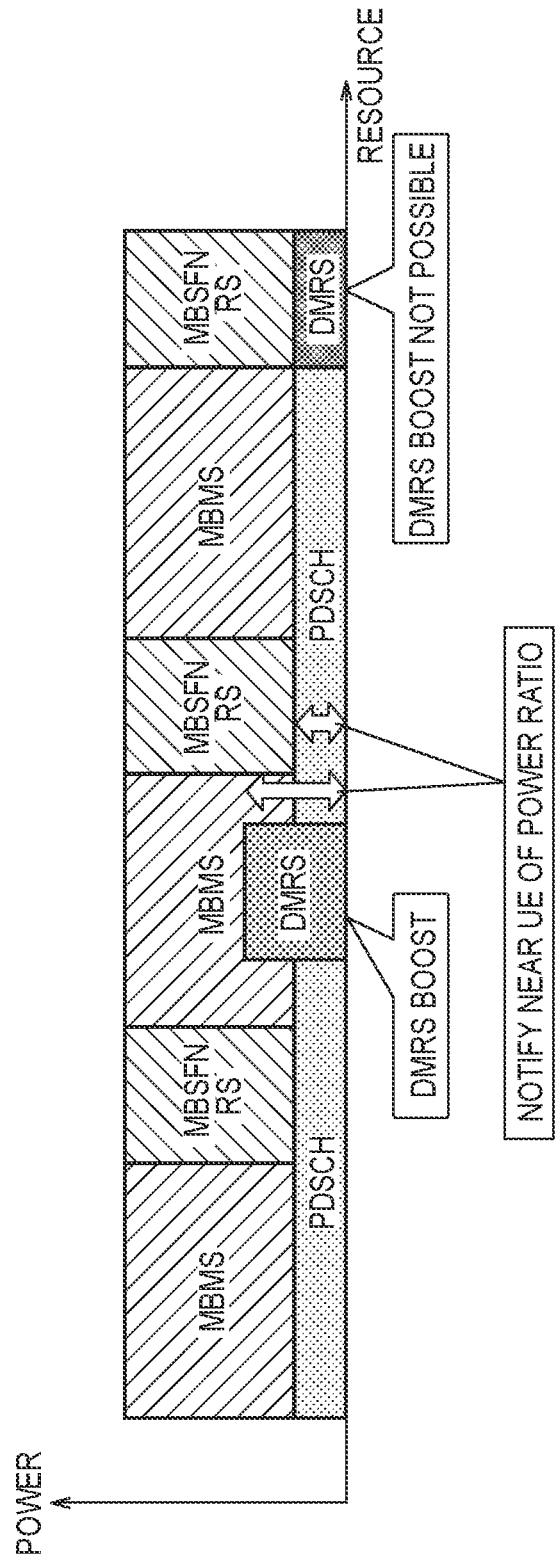

MBSFN RS PATTERN (ANTENNA PORT 4)

DMRS PATTERN FOR EXT. CP (ANTENNA PORT 7/8)

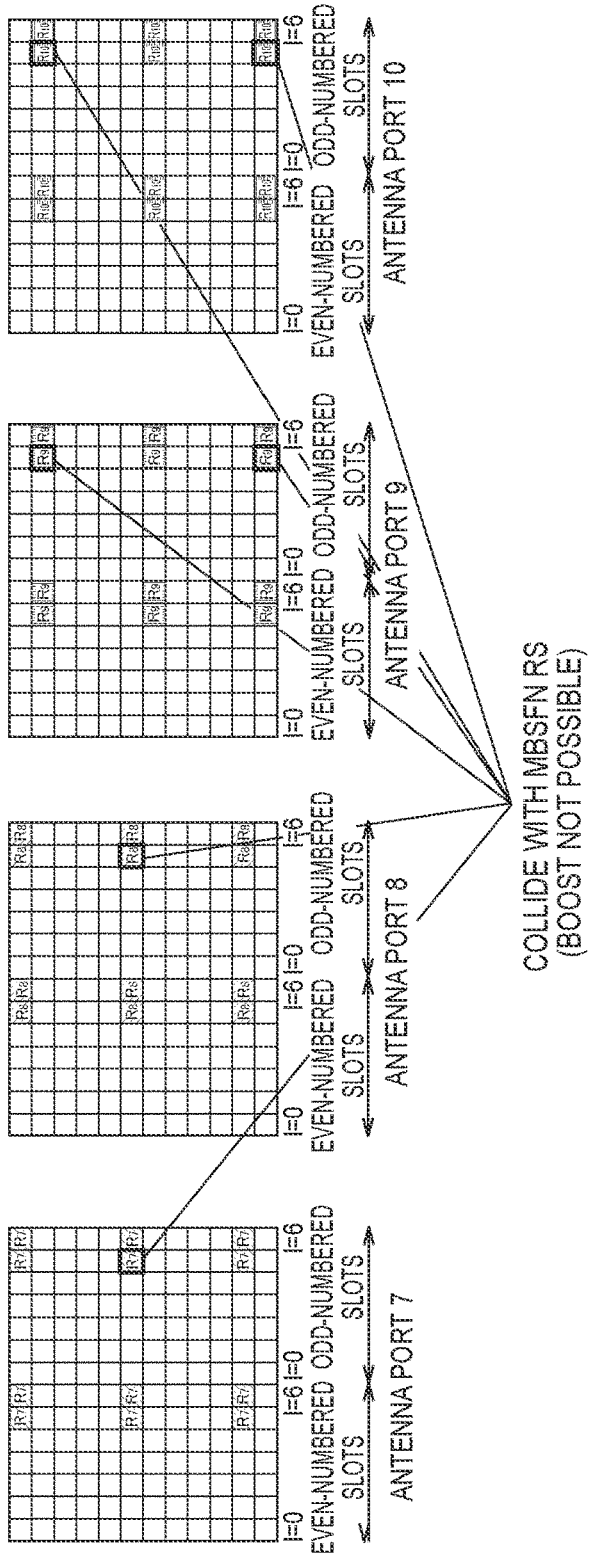

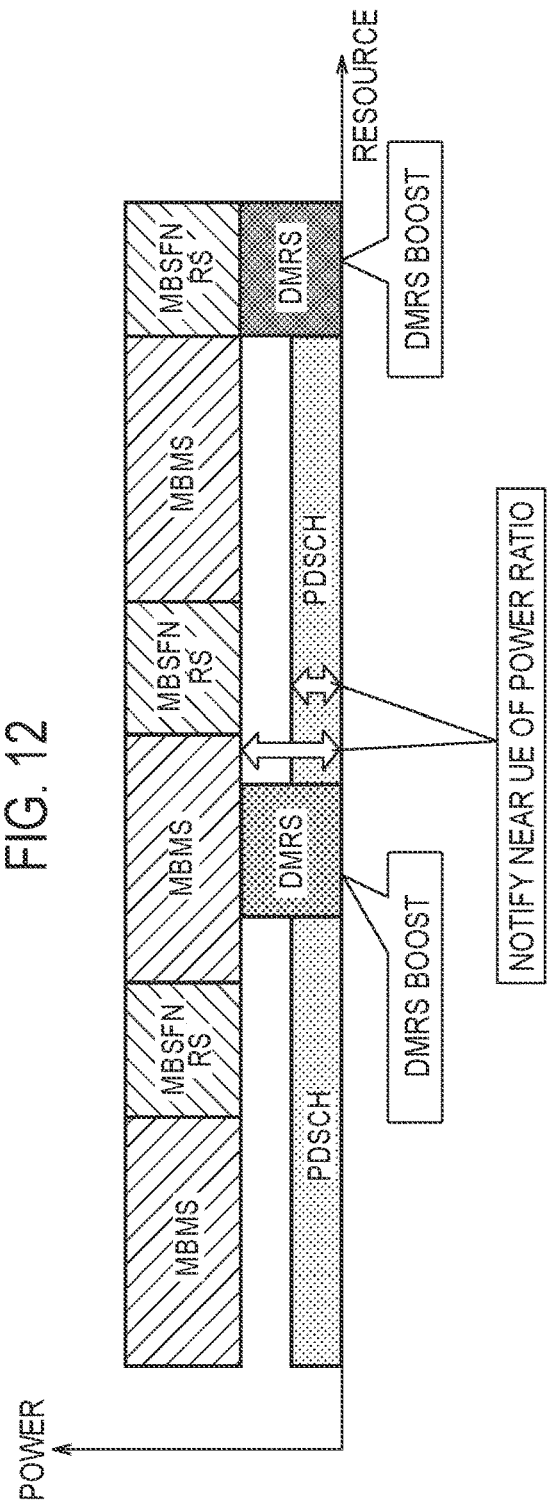

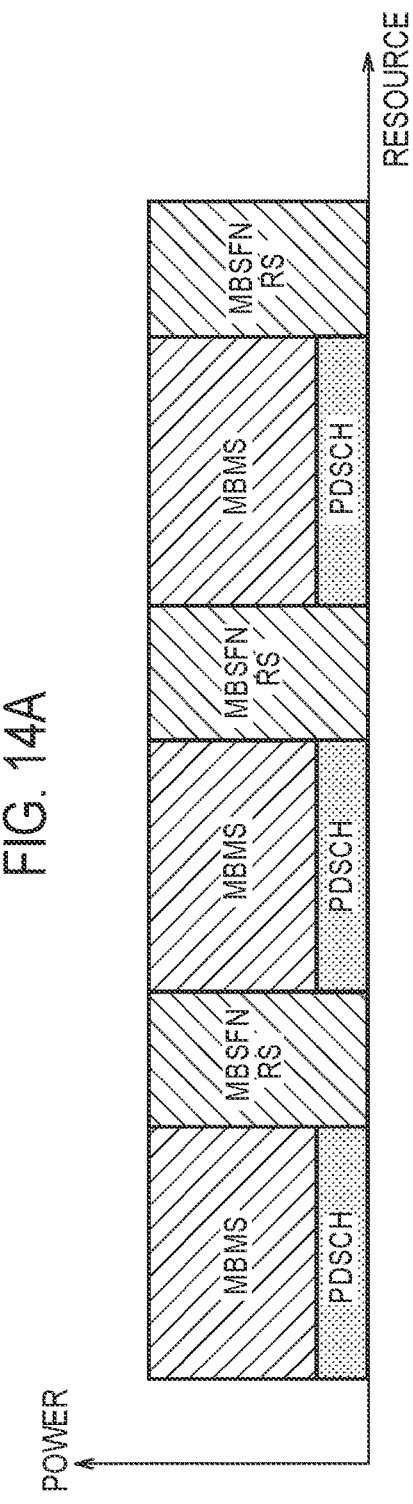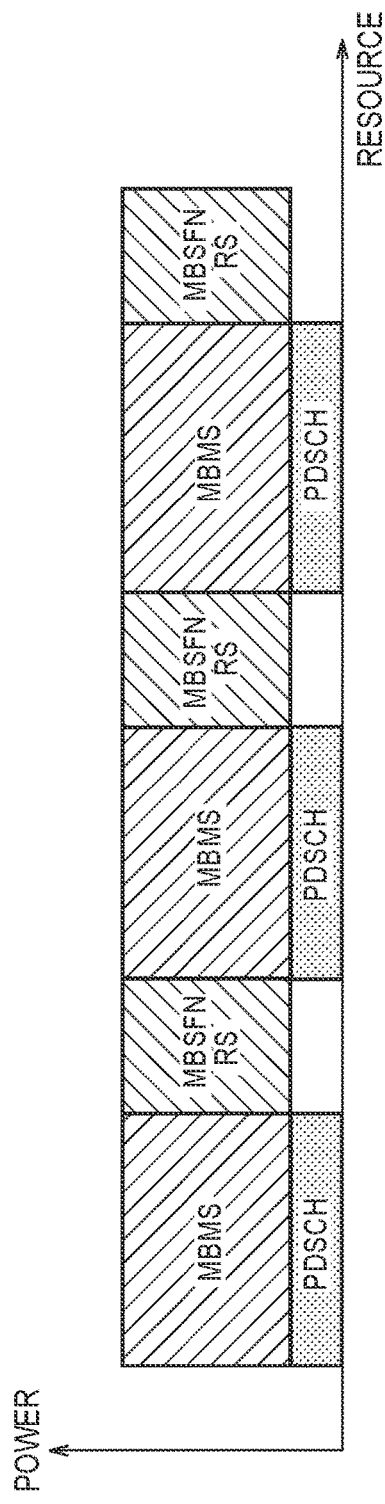

BASE STATION AND RADIO TERMINAL

CROSS-REFERENCE TO RELATED APPLICATION

The present application is a continuation based on PCT Application No. PCT/JP2016/066409 filed on Jun. 2, 2016, which claims the benefit of Japanese Patent Application No. 2015-128350 (filed on Jun. 26, 2015). The content of which is incorporated by reference herein in their entirety.

FIELD

The present invention relates to a base station and a radio terminal in a mobile communication system.

BACKGROUND

In 3GPP (Third Generation Partnership Project), which is a project aiming to standardize a mobile communication system, the specifications of MBMS (Multimedia Broadcast Multicast Service) have been laid out to provide a multicast/broadcast service.

PRIOR ART DOCUMENT

Non-Patent Document

Non Patent Document 1: 3GPP Technical Specification "3GPP TS36.300 V12.5.0", March, 2015

SUMMARY

A base station according to one embodiment includes a controller configured to perform superposition transmission that is a scheme for performing MBMS transmission and PDSCH transmission by using the same time-frequency resource. The controller performs the processes of: transmitting PDSCH data to a radio terminal by the PDSCH transmission and transmitting a demodulation reference signal for demodulating the PDSCH data; and transmitting, to the radio terminal, information indicating a ratio or an offset of a transmission power of the demodulation reference signal with respect to a transmission power of the PDSCH data.

A radio terminal according to one embodiment includes a controller configured to perform communication with a base station configured to perform superposition transmission that is a scheme for performing MBMS transmission and PDSCH transmission by using the same time-frequency resource. The controller performs the processes of: receiving PDSCH data transmitted by the PDSCH transmission and receiving a demodulation reference signal for demodulating the PDSCH data; and receiving, from the base station, information indicating a ratio or an offset of a transmission power of the demodulation reference signal with respect to a transmission power of the PDSCH data.

A base station according to one embodiment includes a controller configured to perform superposition transmission that is a scheme for performing MBMS transmission and PDSCH transmission by using the same time-frequency resource. The controller performs the processes of: transmitting PDSCH data to a radio terminal by the PDSCH transmission; and transmitting MBMS data by the MBMS transmission and transmitting an MBSFN reference signal for demodulating the MBMS data. The MBSFN reference signal is also used for demodulating the PDSCH data in the radio terminal.

A radio terminal according to one embodiment includes a controller configured to perform communication with a base station configured to perform superposition transmission that is a scheme for performing MBMS transmission and PDSCH transmission by using the same time-frequency resource. The controller performs the processes of: receiving PDSCH data transmitted by the PDSCH transmission; receiving an MBSFN reference signal for demodulating MBMS data transmitted by the MBMS transmission; and demodulating the PDSCH data by using the MBSFN reference signal.

BRIEF DESCRIPTION OF THE DRAWINGS

FIG. 9 is a diagram for describing an operation according to the first embodiment.

FIG. 11 is a diagram for describing a DMRS to be excluded from the target of the boost process according to the first embodiment.

FIG. 12 is a diagram for describing a modification 1 of the first embodiment.

FIGS. 14A and 14B are diagrams for describing an operation according to the second embodiment.

DESCRIPTION OF THE EMBODIMENT

Overview of Embodiment

Figure 1:
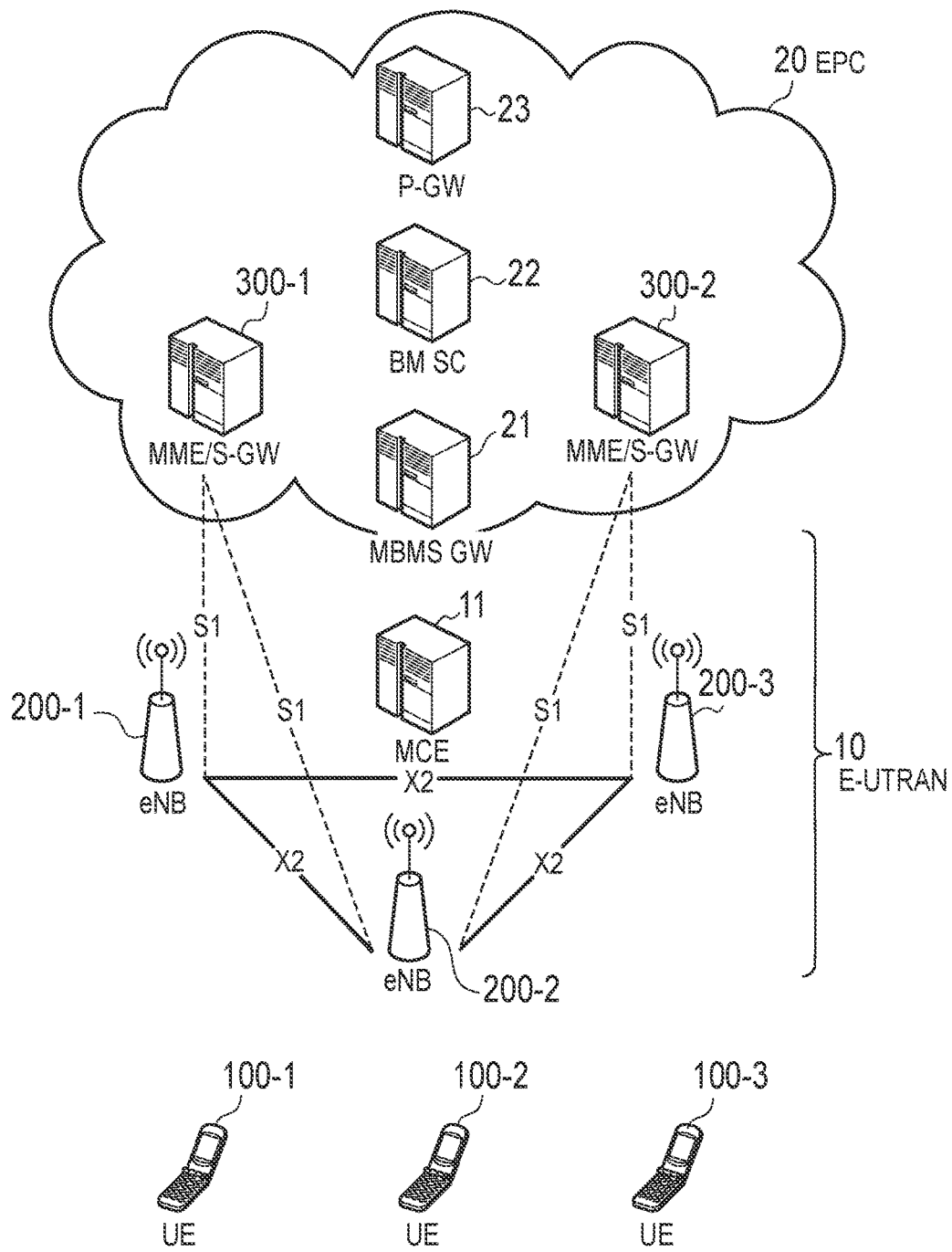
FIG. 1 is a diagram illustrating a configuration of an LTE system.

To improve resource utilization efficiency, superposition transmission of unicast (PDSCH) and MBMS (Unicast & MBMS Superposition) has been discussed. Specifically, a base station performs unicast (PDSCH) transmission and MBMS transmission by using the same time-frequency resource. In other words, the base station superpositions a PDSCH (Physical Downlink Shared Channel) and a PMCH (Physical Multicast Channel) on the same time-frequency resource.

In the superposition transmission of unicast (PDSCH) and MBMS, a transmission power of the unicast transmission (PDSCH transmission power) is set to be lower than a transmission power of the MBMS transmission. As a result, a transmission power of a demodulation reference signal for demodulating PDSCH data is also set to be low, and thus, demodulation performance (that is, channel estimation accuracy) of the PDSCH data in a radio terminal may be deteriorated.

The embodiment provides a base station in which superposition transmission of PDSCH and MBMS (PMCH) can be appropriately performed, and provides also a radio terminal.

A base station according to a first embodiment comprises a controller configured to perform superposition transmission that is a scheme for performing MBMS (Multimedia Broadcast Multicast Service) transmission and PDSCH (Physical Downlink Shared Channel) transmission by using a same time-frequency resource The controller is configured to perform processes of: transmitting PDSCH data to a radio terminal by the PDSCH transmission and transmitting a demodulation reference signal for demodulating the PDSCH data; and transmitting, to the radio terminal, information indicating a ratio or an offset of a transmission power of the demodulation reference signal with respect to a transmission power of the PDSCH data.

In the first embodiment, the controller performs a boost process of setting the transmission power of the demodulation reference signal to be higher than the transmission power of the PDSCH data.

In the first embodiment, the controller is configured to perform processes of; transmitting MBMS data by the MBMS transmission and transmitting an MBSFN (Multicast-Broadcast Single-Frequency Network) reference signal for demodulating the MBMS data; and excluding, from a target of the boost process, the demodulation reference signal overlapping in time-frequency resource with the MBSFN reference signal.

In the first embodiment, the controller is configured to perform processes of; transmitting MBMS data by the MBMS transmission and transmitting an MBSFN reference signal for demodulating the MBMS data; and setting, as a transmission power of the MBSFN reference signal, a remaining transmission power excluding the transmission power of the demodulation reference signal after the boost process out of a total transmission power in the superposition transmission.

In the first embodiment, the controller performs processes of; transmitting MBMS data by the MBMS transmission and transmitting an MBSFN reference signal for demodulating the MBMS data; and regulating the transmission of the PDSCH data overlapping in time-frequency resource with the MBSFN reference signal.

A radio terminal according to the first embodiment comprises a controller configured to perform communication with a base station configured to perform superposition transmission that is a scheme for performing MBMS transmission and PDSCH transmission by using a same time-frequency resource. The controller is configured to perform processes of; receiving PDSCH data transmitted by the PDSCH transmission and receiving a demodulation reference signal for demodulating the PDSCH data; and receiving, from the base station, information indicating a ratio or an offset of a transmission power of the demodulation reference signal with respect to a transmission power of the PDSCH data.

A base station according to a second embodiment comprises a controller configured to perform superposition transmission that is a scheme for performing MBMS (Multimedia Broadcast Multicast Service) transmission and PDSCH (Physical Downlink Shared Channel) transmission by using a same time-frequency resource. The controller is configured to perform processes of: transmitting PDSCH data to a radio terminal by the PDSCH transmission; and transmitting MBMS data by the MBMS transmission and transmitting an MBSFN (Multicast-Broadcast Single-Frequency Network) reference signal for demodulating the MBMS data. The MBSFN reference signal is also used for demodulating the PDSCH data in the radio terminal.

In the second embodiment, the controller is configured to perform a process of transmitting the PDSCH data and the MBSFN reference signal by using a same antenna port.

In the second embodiment, the controller is configured to transmit the PDSCH data by using an antenna port different from an antenna port for transmitting the MBSFN reference signal.

In the second embodiment, the controller is configured to regulate transmission of the PDSCH data overlapping in time-frequency resource with the MBSFN reference signal.

A radio terminal according to the second embodiment comprises a controller configured to perform communication with a base station configured to perform superposition transmission that is a scheme for performing MBMS (Multimedia Broadcast Multicast Service) transmission and PDSCH (Physical Downlink Shared Channel) transmission by using a same time-frequency resource. The controller performs the processes of: receiving PDSCH data transmitted by the PDSCH transmission; receiving an MBSFN (Multicast-Broadcast Single-Frequency Network) reference signal for demodulating MBMS data transmitted by the MBMS transmission; and demodulating the PDSCH data by using the MBSFN reference signal.

[Mobile Communication System]

Hereinafter, an overview of an LTE system that is a mobile communication system according to embodiments will be described.

(Configuration of System)

Figure 2:
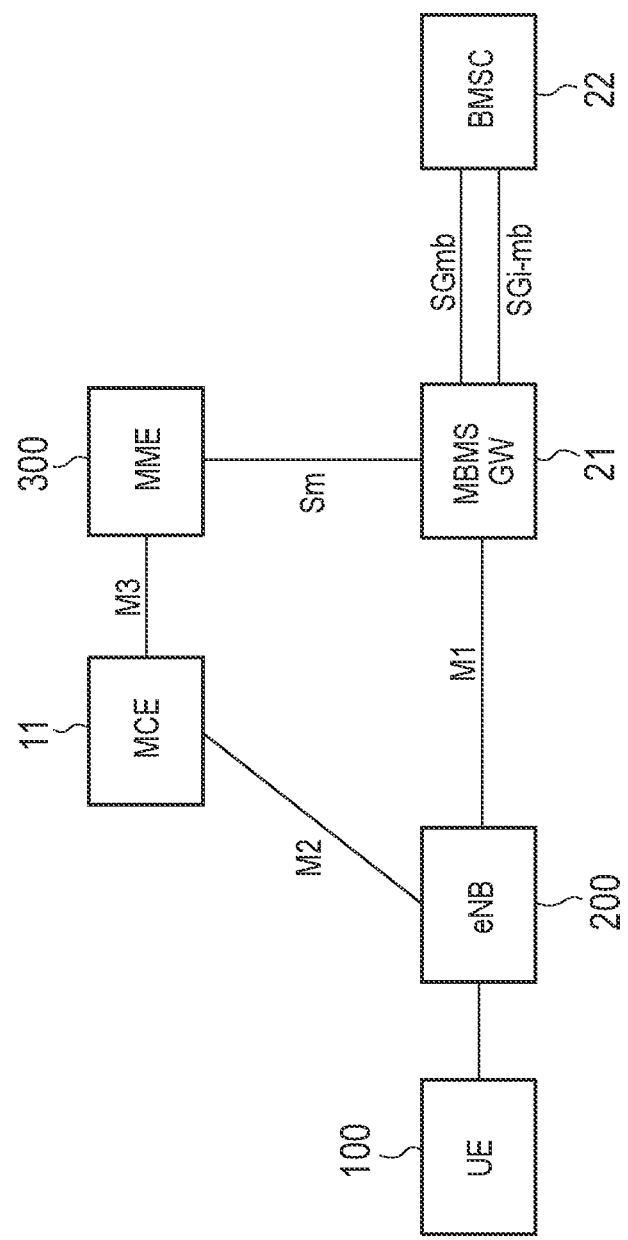
FIG. 2 is a diagram illustrating a network configuration for MBMS/eMBMS.

FIG. 1 is a diagram illustrating a configuration of the LTE system according to the embodiments. FIG. 2 is a diagram illustrating a network configuration for MBMS/eMBMS according to the embodiments.

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20.

The UE 100 corresponds to a radio terminal. The UE 100 is a mobile communication device and performs radio communication with a cell (a serving cell). Configuration of the UE 100 will be described later.

The E-UTRAN 10 corresponds to a radio access network. The E-UTRAN 10 includes a plurality of eNBs (evolved Node-Bs) 200. The eNB 200 corresponds to a base station. The eNBs 200 are connected mutually via an X2 interface. Configuration of the eNB 200 will be described later.

The eNB 200 manages one or a plurality of cells and performs radio communication with the UE 100 which establishes a connection with the cell of the eNB 200. The eNB 200 has a radio resource management (RRM) function, a routing function for user data (hereinafter simply referred as "data"), and a measurement control function for mobility control and scheduling, and the like. It is noted that the "cell" is used as a term indicating a minimum unit of a radio communication area, and is also used as a term indicating a function of performing radio communication with the UE 100.

The EPC 20 corresponds to a core network. The EPC 20 includes a plurality of MME (Mobility Management Entity)/S-GWs (Serving-Gateways) 300. The MME performs various mobility controls and the like for the UE 100. The S-GW performs control to transfer data. MME/S-GW 300 is connected to eNB 200 via an S1 interface. The E-UTRAN 10 and the EPC 20 constitute a network of the LTE system.

Moreover, the E-UTRAN 10 includes an MCE (Multi-Cell/Multicast Coordinating Entity) 11. The MCE 11 is connected to the eNB 200 via a M2 interface and is connected to the MME 300 via a M3 interface (see FIG. 2). The MCE 11 performs MBSFN (Multicast-Broadcast Single-Frequency Network) radio resource management/allocation and the like.

The EPC 20 includes an MBMS GW (Multimedia Broadcast Multicast Service Gateway) 21. The MBMS GW 21 is connected to the eNB 200 via a M1 interface, connected to the MME 300 via a Sm interface, and connected to a BM-SC 22 (see FIG. 2) via a SG-mb interface and a SGi-mb interface. The MBMS GW 21 performs IP multicast data transmission and session control to the eNB 200.

The EPC 20 also includes a BM-SC (Broadcast Multicast Service Center) 22. The BM-SC 22 is connected to the MBMS GW 21 via the SG-mb and SGi-mb interfaces, and is connected to the P-GW 23 via the SGi interface (see FIG. 2). The BM-SC 22 mainly manages and allocates TMGI (Temporary Mobile Group Identity).

(Configuration of Radio Protocol)

Figure 3:
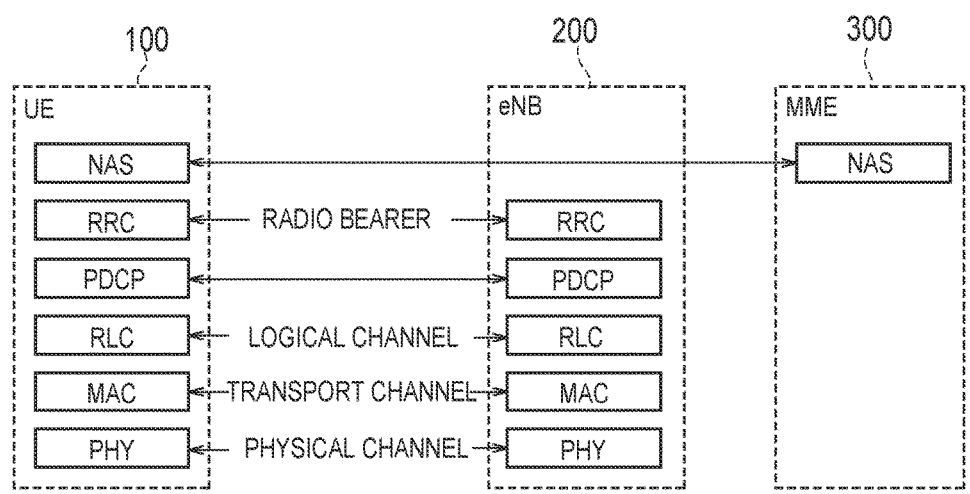
FIG. 3 is a protocol stack diagram of a radio interface in the LTE system.

FIG. 3 is a protocol stack diagram of a radio interface in the LTE system.

As illustrated in FIG. 3, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data and control signal are transmitted via the physical channel.

The MAC layer performs priority control of data, a retransmission process by HARQ (hybrid ARQ), and a random access procedure and the like. Between the MAC layer of the UE 100 and the MAC layer of the eNB 200, data and control signal are transmitted via a transport channel. The MAC layer of the eNB 200 includes a scheduler that determines a transport format of an uplink and a downlink (a transport block size and a modulation and coding scheme (MCS)) and a resource block to be assigned to the UE 100.

The RLC layer transmits data to an RLC layer of a reception side by using the functions of the MAC layer and the PHY layer. Between the RLC layer of the UE 100 and the RLC layer of the eNB 200, data and control signal are transmitted via a logical channel.

The PDCP layer performs header compression and decompression, and encryption and decryption.

The RRC layer is defined only in a control plane dealing with control signal. Between the RRC layer of the UE 100 and the RRC layer of the eNB 200, message (RRC messages) for various types of configuration are transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected mode, otherwise the UE 100 is in an RRC idle mode.

A NAS (Non-Access Stratum) layer positioned above the RRC layer performs a session management, a mobility management and the like.

(Channel Configuration of Downlink)

Figure 4A:
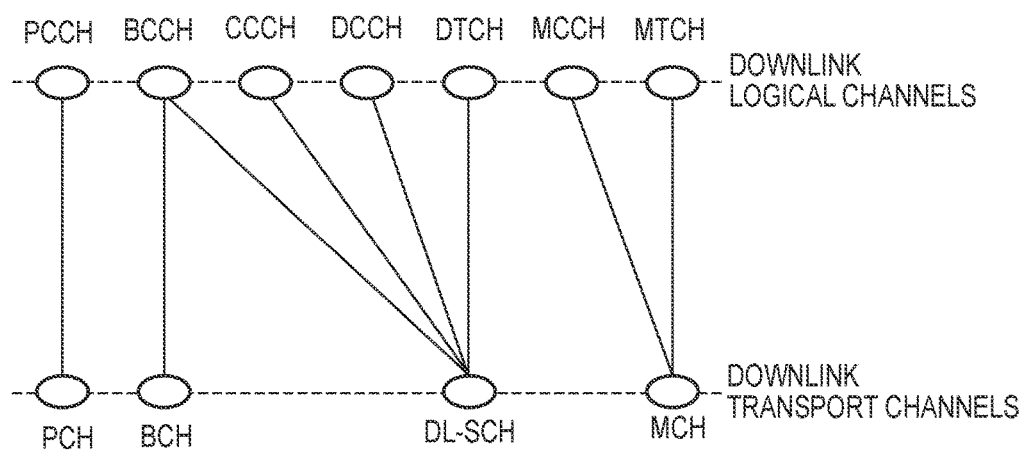
FIGS. 4A and 4B are diagrams illustrating a channel configuration of downlink in the LTE system.
Figure 4B:
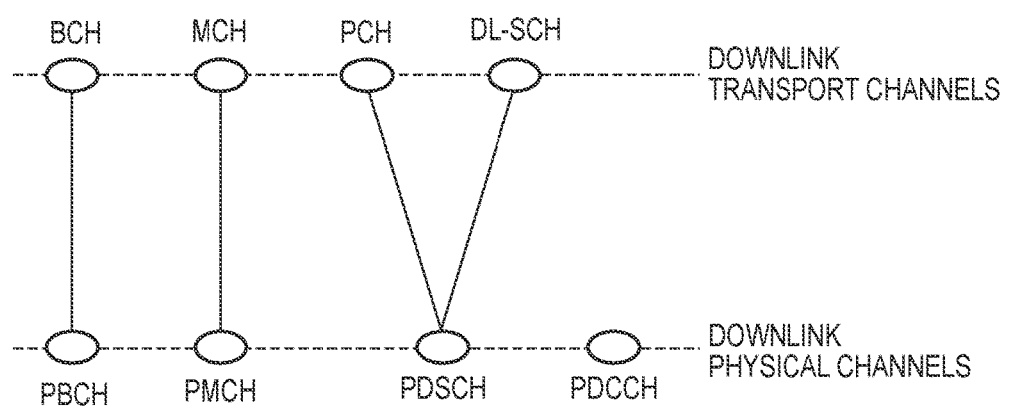

FIGS. 4A and 4B are diagrams illustrating a channel configuration of downlink in the LTE system.

FIG. 4A illustrates mapping between a logical channel (Downlink Logical Channel) and a transport channel (Downlink Transport Channel).

As illustrated in FIG. 4A, a PCCH (Paging Control Channel) is a logical channel for notifying paging information and a system information change. The PCCH is mapped to a PCH (Paging Channel) that is a transport channel.

A BCCH (Broadcast Control Channel) is a logical channel for system information. The BCCH is mapped to a BCH (Broadcast Control Channel) or a DL-SCH (Downlink Shared Channel), both of which are transport channels.

A CCCH (Common Control Channel) is a logical channel for transmission control information between the UE 100 and the eNB 200. The CCCH is used if the UE 100 has no RRC connection with the network. The CCCH is mapped to the DL-SCH.

A DCCH (Dedicated Control Channel) is a logical channel for transmitting individual control information between the UE 100 and the network. The DCCH is used if the UE 100 has the RRC connection. The DCCH is mapped to the DL-SCH.

A DTCH (Dedicated Traffic Channel) is an individual logical channel for transmitting data. The DTCH is mapped to the DL-SCH.

An MCCH (Multicast Control Channel) is a logical channel for one-to-multi (multicast/broadcast) transmission. The MCCH is used for transmitting MBMS control information for MTCH from the network to the UE 100. The MCCH is mapped to an MCH (Multicast Channel) that is a transport channel.

An MTCH (Multicast Traffic Channel) is a logical channel for one-to-multi (multicast/broadcast) data transmission from the network to the UE 100. The MTCH is mapped to the MCH.

FIG. 4B illustrates mapping between a transport channel (Downlink Transport Channel) and a physical channel (Downlink Physical Channel).

As illustrated in FIG. 4B, the BCH is mapped to a PBCH (Physical Broadcast channel).

The MCH is mapped to a PMCH (Physical Multicast Channel). The MCH supports MBSFN transmission (MBMS transmission) by a plurality of cells.

The PCH and the DL-SCH are mapped to a PDSCH (Physical Downlink Shared Channel). The DL-SCH supports an HARQ, a link adaptation, and a dynamic resource allocation.

A PDCCH carries resource allocation information of the PDSCH (the DL-SCH, the PCH), HARQ information on the DL-SCH, and the like. Further, the PDCCH carries an uplink scheduling grant.

(Configuration of Radio Frame)

Figure 5:
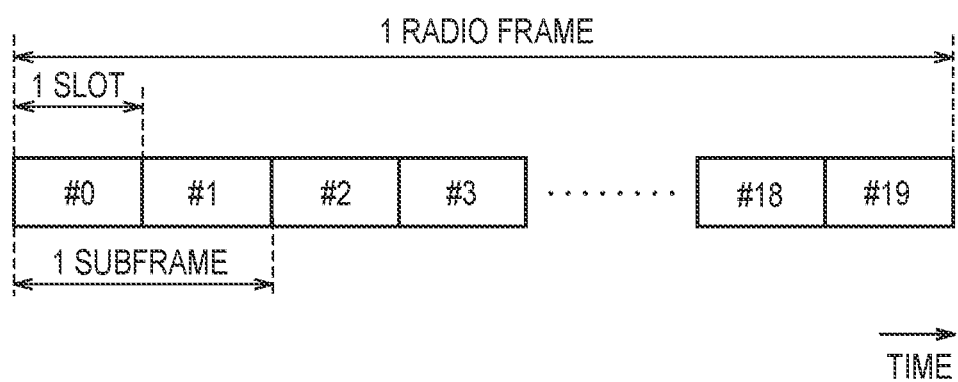
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction (not shown), and a plurality of symbols in the time direction. Each resource block includes a plurality of subcarriers in the frequency direction. One symbol and one subcarrier forms one resource element. Of the radio resources (time and frequency resources) assigned to the UE 100, a frequency resource can be identified by a resource block and a time resource can be identified by a subframe (or a slot).

In the downlink, a section of several symbols at the head of each subframe is a control region used as a physical downlink control channel (PDCCH) for mainly transmitting a downlink control signal. Furthermore, the other portion of each subframe is a region available as a physical downlink shared channel (PDSCH) for mainly transmitting downlink data.

In the downlink, an MBSFN subframe which is a subframe for MBSFN transmission (MBMS transmission) is set. In the MBSFN sub frame, MCH (PMCH) is mapped.

In the uplink, both ends in the frequency direction of each subframe are control regions used as a physical uplink control channel (PUCCH) for mainly transmitting an uplink control signal.

Furthermore, the other portion of each subframe is a region available as a physical uplink shared channel (PUSCH) for mainly transmitting uplink data.

(Configuration of Radio Terminal)

Figure 6:
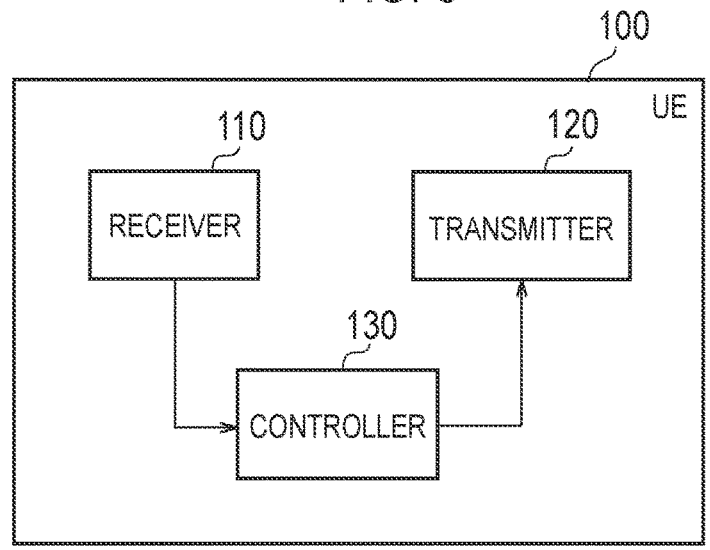
FIG. 6 is a block diagram of a UE (radio terminal).

FIG. 6 is a block diagram of a configuration of the UE 100 (radio terminal) according to the embodiments.

As illustrated in FIG. 6, the UE 100 includes a receiver 110, a transmitter 120, and a controller 130.

The receiver 110 performs various types of reception under the control of the controller 130. The receiver 110 includes an antenna and a receiving machine. The receiving machine converts a radio signal received by the antenna into a baseband signal (reception signal) and outputs it to the controller 130.

The transmitter 120 performs various types of transmission under the control of the controller 130. The transmitter 120 includes an antenna and a transmitting machine. The transmitting machine converts a baseband signal (transmission signal) output from the controller 130 into a radio signal and transmits it from the antenna.

The controller 130 performs various controls in the UE 100. The controller 130 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor may include a codec for encoding/decoding audio/video signals. The processor executes various processes described later and various communication protocols described above.

(Configuration of Base Station)

Figure 7:
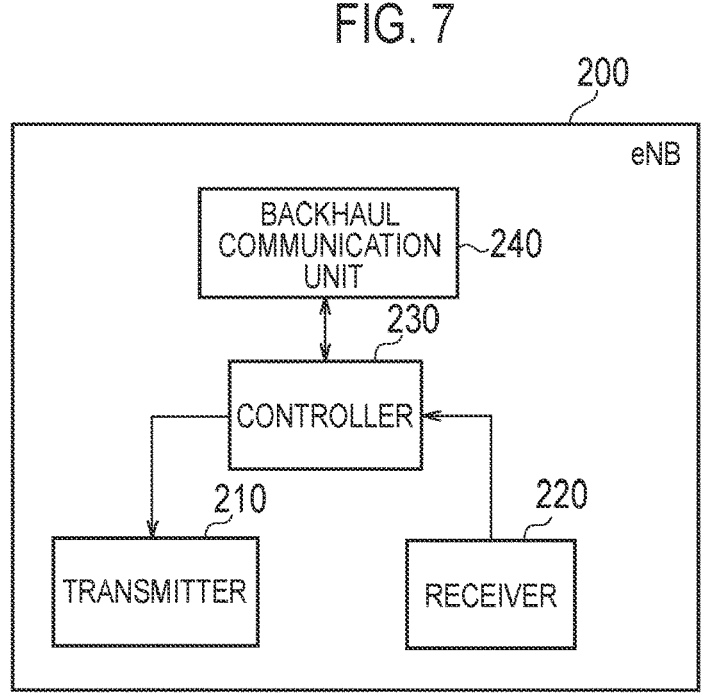
FIG. 7 is a block diagram of an eNB (base station).

FIG. 7 is a block diagram of the eNB 200 (base station) according to the embodiments.

As illustrated in FIG. 7, the eNB 200 includes a transmitter 210, a receiver 220, a controller 230, and a backhaul communication unit 240.

The transmitter 210 performs various transmissions under the control of the controller 230. The transmitter 210 includes an antenna and a transmitting machine. The transmitting machine converts a baseband signal (transmission signal) output from the controller 130 into a radio signal and transmits it from the antenna.

The receiver 220 performs various types of reception under the control of the controller 230. The receiver 220 includes an antenna and a receiving machine. The receiving machine converts a radio signal received by the antenna into a baseband signal (reception signal) and outputs it to the controller 230.

The controller 230 performs various controls in the eNB 200. The controller 230 includes a processor and a memory. The memory stores programs executed by the processor and information used for processing by the processor. The processor includes a baseband processor that performs modulation and demodulation of the baseband signal, performs encoding and decoding, and the like, and a CPU (Central Processing Unit) that executes various programs by executing a program stored in the memory. The processor executes various processes described later and various communication protocols described above.

The backhaul communication unit 240 is connected to the neighboring eNB via the X2 interface and is connected to the MME/S-GW 300 via the S1 interface. The backhaul communication unit 240 is used for communication performed on the X2 interface, communication performed on the S1 interface, and the like.

First Embodiment

A first embodiment will be described, below.

(Unicast and MBMS Superposition Transmission)

Figure 8A:
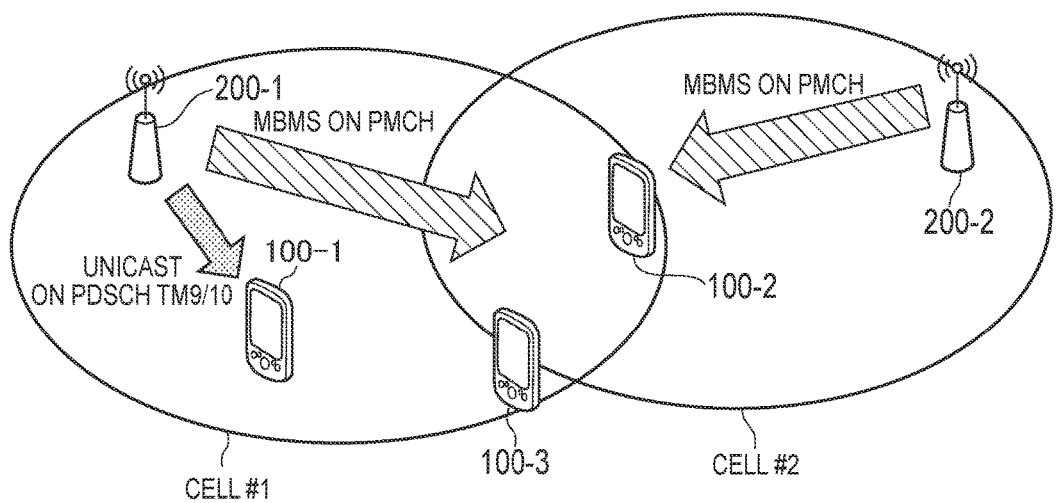
FIGS. 8A and 8B are diagrams for describing unicast and MBMS superposition transmission according to a first embodiment and a second embodiment.
Figure 8B:
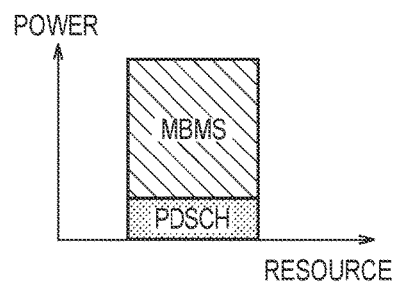

FIGS. 8A and 8B are diagrams for describing unicast and MBMS superposition transmission according to the first embodiment.

As illustrated in FIG. 8A, an eNB 200-1 manages a cell #1, and an eNB 200-2 manages a cell #2. The cell #1 and the cell #2 are partly overlapped. The cell #1 and the cell #2 belong to the same MBSFN area.

The eNB 200-1 and the eNB 200-2 perform MBMS transmission (MBSFN transmission). The eNB 200-1 and the eNB 200-2 transmit the same MBMS data by using the same time-frequency resource. The MBMS data is transmitted on the PMCH. That is, the eNB 200-1 and the eNB 200-2 transmit the MBMS data by using an MBSFN subframe.

Further, the eNB 200-1 and the eNB 200-2 transmit, by using the same time-frequency resource, an MBSFN reference signal (MBSFN RS) for demodulating the MBMS data. The MBSFN RS is a reference signal arranged in the MBSFN subframe. The MBSFN RS allows channel estimation including amplitude information, which makes it possible to appropriately set an amplitude direction threshold value for demodulating a QAM modulation signal, and thus, a QAM modulation can be applied to the MBMS data.

In addition, the eNB 200-1 performs unicast transmission (unicast and MBMS superposition transmission) by using the same time-frequency resource as that of the MBMS transmission. Specifically, the eNB 200-1 transmits, to a UE 100-1, unicast data by using the MBSFN subframe. The unicast data is transmitted on the PDSCH.

Further, the eNB 200-1 transmits, to the UE 100-1, a demodulation reference signal (DMRS) for demodulating the unicast data. Such a DMRS is a UE specific reference signal. The eNB 200-1 transmits the DMRS to the UE 100-1 when transmitting the unicast data to the UE 100-1. A transmission mode involving the DMRS is referred to as a transmission mode 9 (TM 9) or a transmission mode 10 (TM 10), for example. The DMRS allows channel estimation including amplitude information, which makes it possible to appropriately set an amplitude direction threshold value for demodulating a QAM modulation signal, and thus, a QAM modulation can be applied to the unicast data.

As illustrated in FIG. 8B, the eNB 200-1 multiplexes the unicast transmission and the MBMS transmission in a power region, in the unicast and MBMS superposition transmission. Specifically, the eNB 200-1 sets the transmission power of the unicast transmission (that is, the PDSCH transmission power) to be lower than the transmission power of the MBMS transmission.

In the cell #1, the UE 100-1 is located near the eNB 200-1. The UE 100-1 receives unicast data transmitted by the unicast transmission (PDSCH transmission) from the eNB 200-1.

Further, the UE 100-1 receives, as a strong interference signal, MBMS data transmitted by the MBMS transmission from the eNB 200-1. The UE 100-1 cancels MBMS data in a received signal (interference cancellation) to extract unicast data in the received signal. Specifically, the UE 100-1 generates a replica of the MBMS data, and uses the generated replica to cancel the MBMS data in the received signal (interference cancellation: SIC). Note that the UE 100-1 needs to grasp that the unicast and MBMS superposition transmission is applied.

In addition, in the cell #1, a UE 100-2 and a UE 100-3 are located at a remote place (cell end) of the eNB 200-1. The UE 100-2 and the UE 100-3 receive MBMS data.

The UE 100-2 is located in an overlapping region of the cell #1 and the cell #2. The UE 100-2 receives the MBMS data from the eNB 200-1 (cell #1) and the eNB 200-2 (cell #2). The UE 100-2 receives MBMS data in a composite state from a plurality of cells, and thus, the reception quality of the MBMS data is improved. The UE 100-3 receives MBMS data from the eNB 200-1.

The transmission power of the unicast transmission (PDSCH transmission) is set to be lower than the transmission power of the MBMS transmission, and thus, the UE 100-2 and the UE 100-3 located at the cell end receive the unicast data with very low power. Thus, the UE 100-2 and the UE 100-3 can remove the unicast data by regarding it as noise to extract MBMS data in a received signal. Note that the UE 100-2 and the UE 100-3 do not need to grasp that the unicast and MBMS superposition transmission is applied.

Operation According to First Embodiment

As described above, the eNB 200-1 sets, in the unicast and MBMS superposition transmission, the transmission power of the unicast transmission (PDSCH transmission) to be lower than the transmission power of the MBMS transmission. The DMRS is a reference signal not used for the MBMS transmission, and thus, the eNB 200-1 can set the transmission power of the DMRS to be low, similarly to that of the unicast data. As a result, the demodulation performance (that is, the channel estimation accuracy) of the unicast data in the UE 100-1 may be deteriorated.

FIG. 9 is a diagram for describing an operation according to the first embodiment. In FIG. 9, "resource" indicates a time-frequency resource, and "power" indicates the transmission power of the eNB 200-1.

As illustrated in FIG. 9, the eNB 200-1 performs, by using the same time-frequency resource, MBMS transmission and unicast transmission (PDSCH transmission) that requires lower power than the MBMS transmission. The eNB 200-1 transmits unicast data to the UE 100-1 by the unicast transmission and transmits, to the UE 100-1, a demodulation reference signal (DMRS) for demodulating the unicast data. Further, the eNB 200-1 transmits MBMS data by the MBMS transmission and transmits an MBSFN reference signal (MBSFN RS) for demodulating the MBMS data.

In the first embodiment, the eNB 200-1 performs a boost process of setting the transmission power of the DMRS to be higher than the transmission power of the unicast data (that is, the transmission power of the PDSCH). Specifically, the eNB 200-1 sets the transmission power of the DMRS to be high to ensure certain channel estimation accuracy.

In addition, the eNB 200-1 transmits, to the UE 100-1 (Near UE), information indicating a ratio (transmission power ratio) or an offset (difference) of the transmission power of the DMRS with respect to the transmission power of the unicast data. The information may be a value itself of the ratio or the offset of the transmission power of the DMRS with respect to the transmission power of the unicast data, or may be an index value of the ratio or the offset. Hereinafter, such information is referred to as "DMRS power information".

For example, system specific values such as 1)+0 dB, 2)+1 dB, 3)+3 dB are defined, and the eNB 200-1 selects any one value from these values, then explicitly notifies the UE 100-1 of the selected result. Alternatively, the offset may be determined according to a power ratio between the MBMS data and the unicast data (for example, the offset is set to be larger as a power ratio of the PDSCH data is smaller).

The eNB 200-1 transmits, to the UE 100-1, the DMRS power information by an RRC signaling. Alternatively, the eNB 200-1 may transmit, to the UE 100-1, the DMRS power information by the PDCCH. Note that if receiving the DMRS power information from the eNB 200-1, the UE 100-1 may determine that the unicast and MBMS superposition transmission is applied. Alternatively, the eNB 200-1 transmits explicit information indicating that the unicast and MBMS superposition transmission is applied, and the UE 100-1 may determine, based on the explicit information, that the unicast and MBMS superposition transmission is applied.

The UE 100-1 receives the DMRS power information from the eNB 200-1, and grasps the ratio or the offset of the transmission power of the DMRS with respect to the transmission power of the unicast data. For example, the UE 100-1 performs, based on the DMRS received from the eNB 200-1, channel estimation to modify, based on the DMRS power information, a QAM demodulation threshold value (amplitude value). Then, the UE 100-1 demodulates the unicast data, based on a result of the modified channel element. As a result, even if the QAM modulation is applied to the unicast data, the unicast data can be appropriately demodulated.

Note that the eNB 200-1 may also transmit, to the UE 100-1, information on a power ratio between the transmission power of the MBMS data and the transmission power of the DMRS. The information is used for amplitude information of a replica signal at the time of removing the MBMS data through SIC. Since the power distributed to the MBMS data is small in a time segment during which the DMRS is boosted, the UE 100-1 changes the power of the replica signal at the time of removing the MBMS data.

Further, the eNB 200-1 may determine the transmission power of the DMRS so that the ratio to the transmission power of the MBMS data becomes constant. The constant value is one system specific value, or a value selected by the eNB 200-1 from a plurality of system specific values. The eNB 200-1 notifies the UE 100-1 of the selected value.

However, the eNB 200-1 needs to set the transmission power of the MBSFN RS to be constant in every resource element (RE), and thus, excludes, from a target of the boost process, an RE overlapping (colliding) with the MBSFN RS. Even through some REs cannot be boosted, the UE 100-1 can recognize that only the REs are not boosted, and thus, there would be no problem.

Figure 10A:
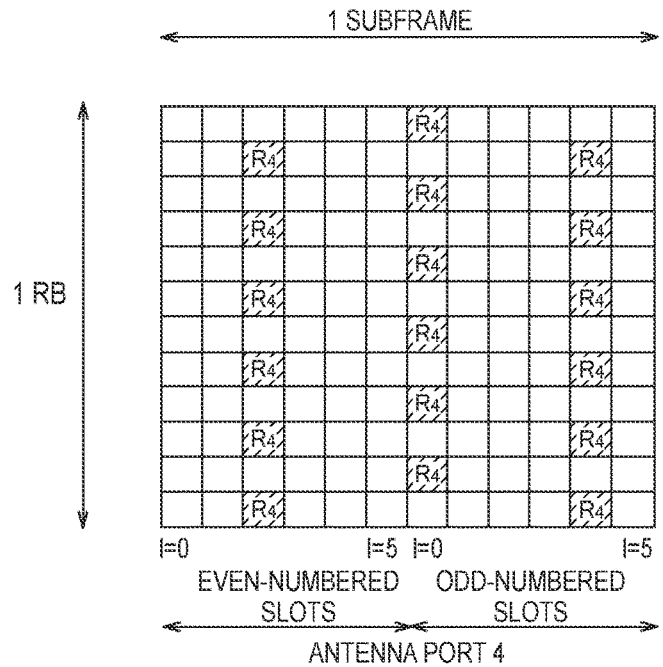
FIGS. 10A and 10B are diagrams for describing a DMRS to be excluded from a target of a boost process according to the first embodiment.
Figure 10B:
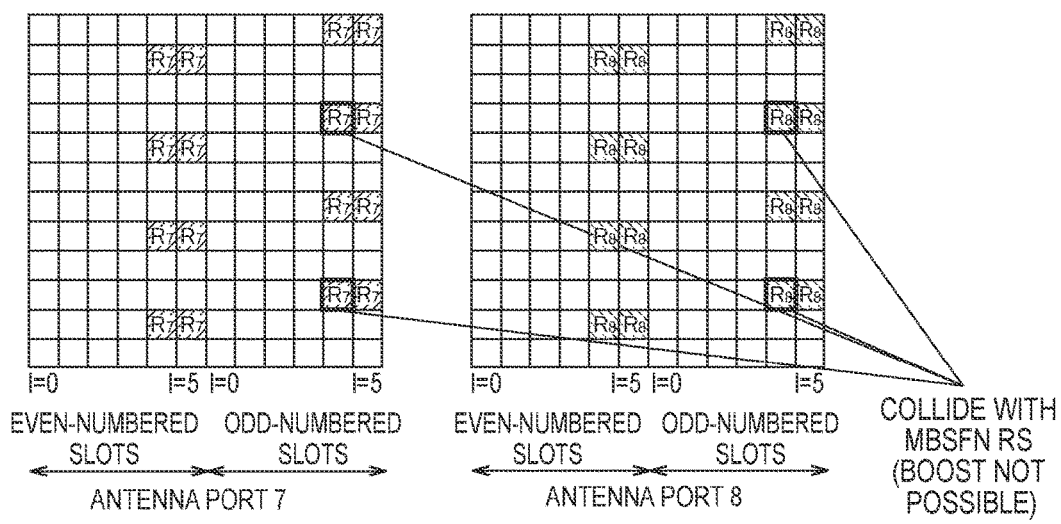

FIGS. 10A to 10B and FIG. 11 are diagrams for describing a DMRS to be excluded from the target of the boost process.

FIGS. 10A and 10B assume a case where an extended cyclic prefix (Ext. CP) is applied to the unicast transmission (PDSCH transmission) to be superpositioned with the MBMS transmission.

As illustrated in FIG. 10A, the eNB 200-1 performs the MBMS transmission by using an "antenna port 4". That is, the eNB 200-1 transmits the MBMS data and the MBSFN RS by using the "antenna port 4". In FIG. 10A, an RE in which the MBSFN RS is arranged is an RE indicated by "$R_4$".

As illustrated in FIG. 10B, the TM 9 or the TM 10 in the Ext. CP includes only an "antenna port 7" or an "antenna port 8". That is, the eNB 200-1 transmits the unicast data and the DMRS by using the "antenna port 7" or the "antenna port 8". Note that a "Special Subframe" in TDD is not a target to be set with the MBSFN, and thus, a subframe other than the "Special Subframe" is assumed. In FIG. 10B, an RE in which the DMRS is arranged is an RE indicated by "$R_7$" for the "antenna port 7" and an RE indicated by "$R_8$" for the "antenna port 8".

As illustrated in FIG. 10A and FIG. 10B, some REs ($R_4$) in which the MBSFN RS is arranged overlap (collide) with some REs ($R_7$, $R_8$) in which the DMRS is arranged. The eNB 200-1 excludes, from a target of the boost process, some REs ($R_7$, $R_8$) overlapping with the MBSFN RS.

Meanwhile, FIG. 11 assumes a case where a normal cyclic prefix (Normal CP) is applied to the unicast transmission (PDSCH transmission) to be superpositioned with the MBMS transmission.

As illustrated in FIG. 11, the TM 9 or the TM 10 in the Normal CP includes the "antenna port 7" through an "antenna port 14". That is, the eNB 200-1 transmits the unicast data and the DMRS by using the "antenna port 7" through the "antenna port 14". Note that the "Special Subframe" in TDD is not a target to be set with the MBSFN, and thus, a subframe other than the "Special Subframe" is assumed. In FIG. 11, an RE in which the DMRS is arranged is an RE indicated by "$R_7$" for the "antenna port 7", an RE indicated by "$R_8$" for the "antenna port 8", an RE indicated by "$R_9$" for the "antenna port 9", and an RE indicated by "$R_{10}$" for the "antenna port 10".

As illustrated in FIG. 10A and FIG. 11, some REs ($R_4$) in which the MBSFN RS is arranged overlap (collide) with some REs ($R_7$, $R_8$, $R_9$, $R_{10}$) in which the DMRS is arranged. The eNB 200-1 excludes, from a target of the boost process, some REs ($R_7$, $R_8$, $R_9$, $R_{10}$) overlapping with the MBSFN RS.

Summary of First Embodiment

According to the first embodiment, superposition transmission of unicast and MBMS can be appropriately performed. This allows an introduction of MBMS while suppressing a decrease in a capacity of the unicast transmission. Conversely, if the MBMS has already been introduced, it is possible to increase a capacity of a normal unicast transmission.

Modification 1 of First Embodiment

In the above-described first embodiment, the eNB 200-1 excludes, from a target of the boost process, some REs overlapping with the MBSFN RS. However, in the present modification, the eNB 200-1 performs the boost process also on some REs overlapping with the MBSFN RS.

FIG. 12 is a diagram for describing a modification 1 of the first embodiment. Here, differences from the above-described first embodiment will be described.

As illustrated in FIG. 12, the eNB 200-1 sets, as the transmission power of the MBSFN RS, a remaining transmission power excluding the transmission power of the DMRS after the boost process out of the total transmission power (prescribed total transmission power) in the unicast and MBMS superposition transmission. FIG. 12 illustrates an example to match the transmission power of the MBSFN RS and the transmission power of the MBMS data. Note that if using QAM (16 QAM/64 QAM), the UE can assume that the MBSFN RS and the MBMS data are transmitted with the same power, and thus, the transmission power of the MBSFN RS and the transmission power of the MBMS data need to be matched. However, if using QPSK, the transmission power is not necessarily matched.

As above, the eNB 200-1 sets the transmission power of the MBMS transmission to be low, according to the transmission power of the DMRS. This allows the eNB 200-1 to boost the transmission power of all DMRSs, and thus, the demodulation performance (that is, the channel estimation accuracy) of the unicast data can be further improved.

Modification 1-1 of First Embodiment

The above-described modification 1 of the first embodiment may be modified as follows.

The eNB 200-1 sets, in one symbol interval (OFDM symbol), the sum of: an average of the transmission power of the unicast data and the transmission power of the DMRS; and the MBSFN RS to be the prescribed total transmission power. Here, the "average" means a weighted average based on the number of subcarriers used for transmitting the unicast data and the number of subcarriers used for transmitting the DMRS.

Specifically, it is set so that the total transmission power of an RE in which the DMRS is transmitted exceeds the prescribed total transmission power, but the total transmission power of an RE in which the unicast data is transmitted becomes smaller than the prescribed total transmission power. The prescribed total transmission power is obtained by taking an average over the entire OFDM symbols (that is, over a plurality of subcarriers).

Modification 1-2 of First Embodiment

The above-described modification 1 of the first embodiment may be modified as follows.

The OFDM symbol including the DMRS is applied with a similar operation to that in the above-described modification 1-1. On the other hand, for the OFDM symbol not including the DMRS, the sum of the transmission power of the MBSFN RS and the transmission power of the unicast data (not the DMRS) becomes the prescribed total transmission power.

Modification 2 of First Embodiment

Figure 13:
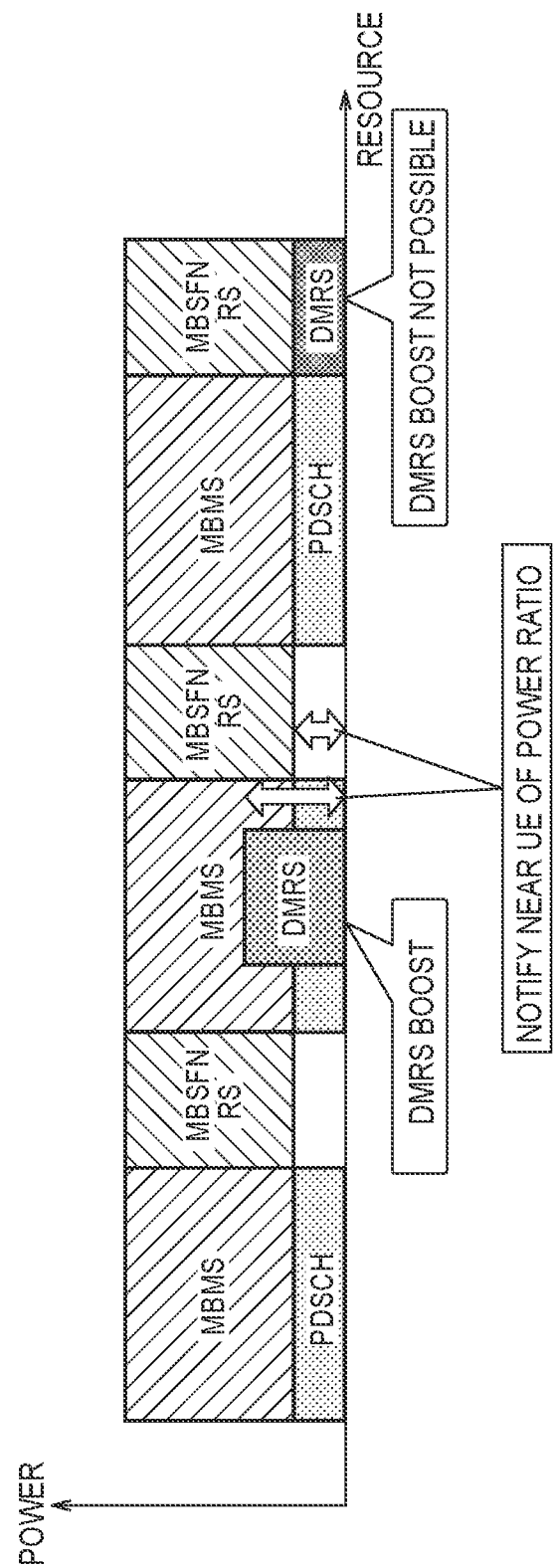
FIG. 13 is a diagram for describing a modification 2 of the first embodiment.

FIG. 13 is a diagram for describing a modification 2 of the first embodiment.

As illustrated in FIG. 13, the eNB 200-1 may stop transmission of the unicast data (PDSCH) overlapping in RE with the MBSFN RS. Alternatively, the eNB 200-1 may set the transmission power of the unicast data (PDSCH) overlapping in RE with the MBSFN RS to be lower than the transmission power of the unicast data (PDSCH) not overlapping in RE with the MBSFN RS.

As above, by regulating transmission of the unicast data (PDSCH) overlapping in RE with the MBSFN RS, the accuracy of channel estimation using the MBSFN RS can be improved.

Second Embodiment

A second embodiment will be described while focusing on differences from the above-described first embodiment, below.

The second embodiment is similar to the first embodiment in a method of performing general unicast and MBMS superposition transmission (see FIGS. 8A and 8B). That is, the eNB 200-1 according to the second embodiment performs, by using the same time-frequency resource, MBMS transmission and unicast transmission that requires lower power than the MBMS transmission.

In the second embodiment, the eNB 200-1 transmits the unicast data and the MBSFN RS by using the same antenna port. Specifically, the eNB 200-1 performs the MBMS transmission by using the "antenna port 4" and performs the unicast transmission (PDSCH transmission) by using the "antenna port 4".

Further, in the second embodiment, the MBSFN RS is also used for demodulating the unicast data in the UE 100-1 (Near UE). That is, the MBSFN RS is commonly used for demodulating the MBMS data and demodulating the unicast data. The UE 100-1 receives the unicast data and the MBSFN RS, and performs channel estimation by using the MBSFN RS to demodulate the unicast data.

FIGS. 14A and 14B are diagrams for describing an operation according to the second embodiment.

As illustrated in FIG. 14A, the eNB 200-1 performs, by using the same time-frequency resource, MBMS transmission and unicast transmission (PDSCH transmission) that requires lower power than the MBMS transmission. The eNB 200-1 transmits the unicast data to the UE 100-1 by the unicast transmission by using the "antenna port 4". In the second embodiment, the eNB 200-1 may not need to transmit the DMRS when performing the unicast transmission. Further, the eNB 200-1 transmits the MBMS data and the MBSFN RS by using the "antenna port 4". FIG. 14A illustrates an example where the eNB 200-1 transmits the MBSFN RS with the maximum transmission power.

The eNB 200-1 does not transmit the unicast data (PDSCH) overlapping in RE with the MBSFN RS. If the QAM modulation is used for the MBMS data, the eNB 200-1 transmits, to each UE 100, information on the power ratio between the MBMS data and the MBSFN RS. If a QPSK modulation is used for the MBMS data, the eNB 200-1 may not need to transmit the information to each UE 100.

Alternatively, as illustrated in FIG. 14B, the eNB 200-1 matches the transmission power of the MBSFN RS and the transmission power of the MBMS data. The eNB 200-1 may stop the transmission of the unicast data overlapping in RE with the MBSFN RS. Alternatively, the eNB 200-1 may set the transmission power of the unicast data (PDSCH) overlapping in RE with the MBSFN RS to be lower than the transmission power of the unicast data (PDSCH) not overlapping in RE with the MBSFN RS. As above, by regulating transmission of the unicast data (PDSCH) overlapping in RE with the MBSFN RS, the accuracy of channel estimation using the MBSFN RS can be improved.

According to the second embodiment, by commonly using the MBSFN RS for demodulating the MBMS data and demodulating the unicast data, a deterioration in the demodulation performance (that is, the channel estimation accuracy) of the unicast data in the UE 100-1 can be prevented. As a result, superposition transmission of unicast and MBMS can be appropriately performed.

Modification of Second Embodiment

In the above-described second embodiment, the eNB 200-1 performs the MBMS transmission by using the "antenna port 4" and performs the unicast transmission (PDSCH transmission) by using the "antenna port 4". However, the eNB 200-1 may perform the unicast transmission by using a particular antenna port different from the "antenna port 4".

The particular antenna port is a child antenna port succeeding the "antenna port 4" and is an antenna port capable of using a result of channel estimation on the "antenna port 4". The eNB 200-1 may notify the UE 100-1 of information (such as an antenna port number) on the particular antenna port used for the unicast transmission. The information on the particular antenna port (child antenna port) may include information (such as a parent antenna port number) indicating the succession (reference) of a parent antenna port (that is, the antenna port 4).

If demodulating the unicast data transmitted via the particular antenna port (child antenna port), the UE 100-1 first demodulates the MBMS data according to a setting of the master antenna port, then removes the MBMS data (SIC) by using a replica signal of the demodulated data to demodulate the unicast data corresponding to the child antenna port.

Other Embodiments

The eNB 200-1 may select a UE interested in reception of MBMS data to be superpotisioned, as a particular UE (a UE to which the unicast data is addressed) to be applied with the unicast and MBMS superposition transmission. In this case, the UE needs to remove the MBMS data through SIC to demodulate the unicast data, but can use, for the SIC, a demodulation result of the MBMS data to be received by the UE itself. Thus, an increase in power consumption can be suppressed. Note that a UE not interested in reception of the MBMS data needs to perform SIC after demodulating the MBMS data that is not originally required to be received, which becomes a problem.

Although not particularly mentioned in each of the above-described embodiments, SC-PTM (Single Cell-Point To Multipoint) transmission has been discussed in which multicast transmission is performed by using a PDSCH. If the SC-PTM transmission is applied, in each of the above-described embodiments, the unicast and MBMS superposition transmission may be replaced with SC-PTM and MBMS superposition transmission, the unicast transmission may be replaced with SC-PTM transmission, and the unicast data may be replaced with SC-PTM data. Further, the unicast transmission and the SC-PTM transmission may be collectively called PDSCH transmission. The unicast data and the SC-PTM data may be collectively called PDSCH data.

In each of the above-described embodiments, the LTE system is exemplified as the mobile communication system, and LTE communication is exemplified as WWAN communication. However, the present invention is not limited to the LTE system. The present invention may be applied to the mobile communication system other than the LTE system.

INDUSTRIAL APPLICABILITY

The present application is useful in the field of communication.

The invention claimed is:

1. A base station, comprising:
a controller configured to perform superposition transmission that is a scheme for performing MBMS (Multimedia Broadcast Multicast Service) transmission and PDSCH (Physical Downlink Shared Channel) transmission by using a same time-frequency resource, wherein
the controller is configured to perform processes of:
transmitting PDSCH data to a radio terminal by the PDSCH transmission and transmitting a demodulation reference signal for demodulating the PDSCH data; and
transmitting, to the radio terminal, information indicating a ratio or an offset of a transmission power of the demodulation reference signal with respect to a transmission power of the PDSCH data.

2. The base station according to claim 1, wherein
the controller performs a boost process of setting the transmission power of the demodulation reference signal to be higher than the transmission power of the PDSCH data.

3. The base station according to claim 2, wherein
the controller is configured to perform processes of:
transmitting MBMS data by the MBMS transmission and transmitting an MBSFN (Multicast-Broadcast Single-Frequency Network) reference signal for demodulating the MBMS data; and
excluding, from a target of the boost process, the demodulation reference signal overlapping in time-frequency resource with the MBSFN reference signal.

4. The base station according to claim 2, wherein
the controller is configured to perform processes of:
transmitting MBMS data by the MBMS transmission and transmitting an MBSFN reference signal for demodulating the MBMS data; and
setting, as a transmission power of the MBSFN reference signal, a remaining transmission power excluding the transmission power of the demodulation reference signal after the boost process out of a total transmission power in the superposition transmission.

5. The base station according to claim 1, wherein
the controller is configured to perform processes of:
transmitting MBMS data by the MBMS transmission and transmitting an MBSFN reference signal for demodulating the MBMS data; and
regulating the transmission of the PDSCH data overlapping in time-frequency resource with the MBSFN reference signal.

6. A base station, comprising:
a controller configured to perform superposition transmission that is a scheme for performing MBMS (Multimedia Broadcast Multicast Service) transmission and PDSCH (Physical Downlink Shared Channel) transmission by using a same time-frequency resource, wherein
the controller is configured to perform processes of:
transmitting PDSCH data to a radio terminal by the PDSCH transmission; and
transmitting MBMS data by the MBMS transmission and transmitting an MBSFN (Multicast-Broadcast Single-Frequency Network) reference signal for demodulating the MBMS data, and
the MBSFN reference signal is also used for demodulating the PDSCH data in the radio terminal.

7. The base station according to claim 6, wherein
the controller is configured to perform a process of transmitting the PDSCH data and the MBSFN reference signal by using a same antenna port.

8. The base station according to claim 6, wherein
the controller is configured to transmit the PDSCH data by using an antenna port different from an antenna port for transmitting the MBSFN reference signal.

9. The base station according to claim 6, wherein
the controller is configured to regulate transmission of the PDSCH data overlapping in time-frequency resource with the MBSFN reference signal.

10. A radio terminal, comprising:
a controller configured to perform communication with a base station configured to perform superposition transmission that is a scheme for performing MBMS (Multimedia Broadcast Multicast Service) transmission and PDSCH (Physical Downlink Shared Channel) transmission by using a same time-frequency resource, wherein
the controller performs the processes of:
receiving PDSCH data transmitted by the PDSCH transmission;
receiving an MBSFN (Multicast-Broadcast Single-Frequency Network) reference signal for demodulating MBMS data transmitted by the MBMS transmission; and
demodulating the PDSCH data by using the MBSFN reference signal.

* * * * *